(12) United States Patent
Draxelmayr et al.

(10) Patent No.: US 6,357,298 B1
(45) Date of Patent: Mar. 19, 2002

(54) MICROMECHANICAL SENSOR AND METHOD FOR OPERATING THE SENSOR

(75) Inventors: Dieter Draxelmayr, Villach (AT); Hans-Jörg Timme, Ottobrunn (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/538,791

(22) Filed: Mar. 30, 2000

Related U.S. Application Data

(63) Continuation of application No. PCT/DE98/02912, filed on Sep. 30, 1998.

(51) Int. Cl.[7] ............................................. G01L 9/12
(52) U.S. Cl. ............................................................ 73/724
(58) Field of Search ............................... 73/1.07, 1.62, 73/701, 708, 715–730; 361/283.1, 283.2, 283.3, 283.4

(56) References Cited

U.S. PATENT DOCUMENTS

| 5,022,270 A | 6/1991 | Rud, Jr. ........................ 73/706 |
| 5,044,203 A | 9/1991 | Wiest et al. .................... 73/730 |
| 5,431,057 A | 7/1995 | Zimmer et al. ................. 73/724 |

FOREIGN PATENT DOCUMENTS

| DE | 37 23 561 A | 1/1988 |
| DE | 43 40 481 C1 | 3/1995 |
| DE | 44 18 207 C1 | 6/1995 |
| DE | 44 01 999 C2 | 4/1996 |
| DE | 196 17 164 A1 | 11/1996 |
| EP | 0 753 728 A2 | 1/1997 |
| EP | 0 813 047 A2 | 12/1997 |
| GB | 2 194 059 A | 2/1988 |

Primary Examiner—William Oen
(74) Attorney, Agent, or Firm—Hebert L. Lerner; Laurence A. Greenberg; Werner H. Stemer

(57) ABSTRACT

A sensor, in particular a micromechanical pressure sensor, has two identical capacitive partial structures coupled to an evaluation circuit. In the case of in-phase driving, an additive signal is present as a pressure-dependent useful signal. In the case of in-antiphase driving, a difference signal is present as a diagnostic signal.

12 Claims, 2 Drawing Sheets

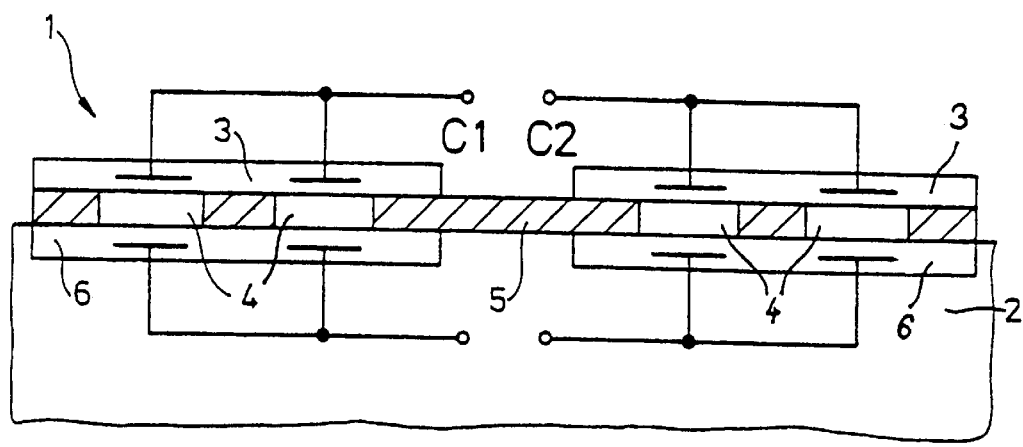
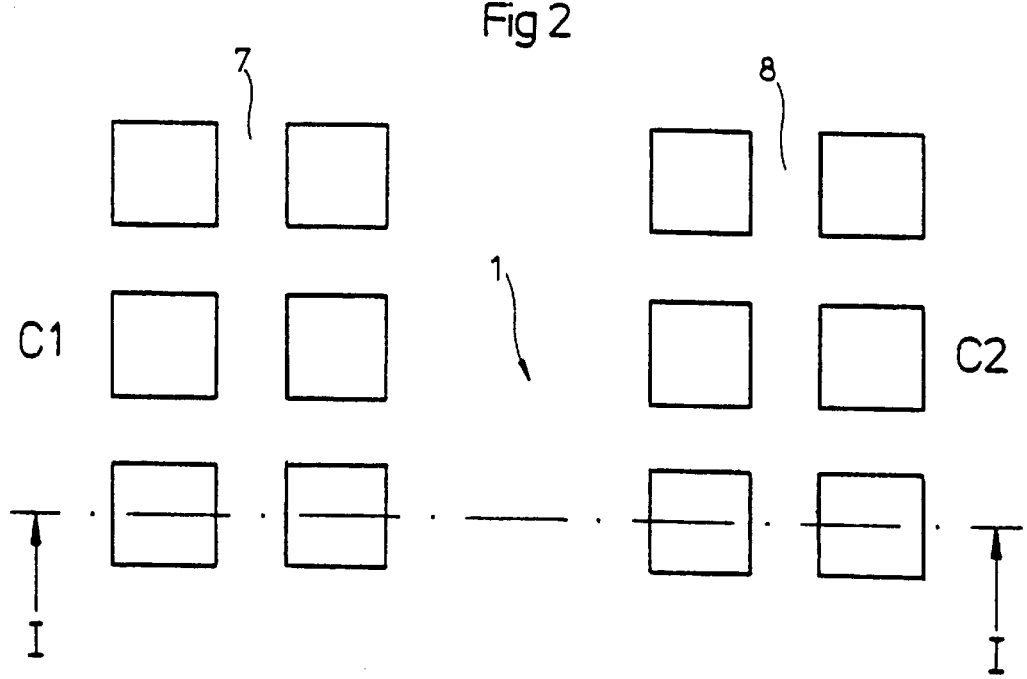

MICROMECHANICAL SENSOR AND METHOD FOR OPERATING THE SENSOR

CROSS-REFERENCE TO RELATED APPLICATION

This application is a continuation of copending International Application No. PCT/DE98/02912, filed Sep. 30, 1998, which designated the United States.

BACKGROUND OF THE INVENTION

Field of the Invention

The invention relates to a micromechanical sensor and to a method for operating a micromechanical sensor.

A micromechanical sensor of this type is for example disclosed in the form of a micromechanical silicon pressure sensor in the German Patent DE 44 18 207 C1. Such sensors essentially include a diaphragm which is clamped on all sides and bulges when there is a pressure difference between the two diaphragm surfaces. The signal conversion is performed for example using integrated monocrystalline or dielectrically isolated polycrystalline piezoresistors or through the use of capacitance measurements with respect to a fixed counterelectrode (piezoresistive or capacitive signal conversion). A customary requirement made of such sensors is that their properties should not change appreciably over the course of time. Particularly in the case of sensors relevant to safety, such as for example in active occupant protection devices in the motor vehicle sector (airbag), it is desirable that specific changes, which are to be noticed, in particular defects, be identified immediately and, in response, measures be taken to preclude inadvertent faulty reactions. A self-test that can be carried out directly for pressure sensors is not known at the present time. In indirect self-tests, it is possible to distinguish between passive and active self-tests. An active self-test can be performed through the use of a defined electrostatic deflection and a corresponding sampling of the resulting sensor signal. In this case, however, significant difficulties exist: firstly a counterelectrode is required for the electrostatic deflection of a silicon pressure sensor diaphragm. However, such a counterelectrode is not present in silicon pressure sensors fabricated through the use of bulk micromachining. In pressure sensors fabricated by surface micromachining (or more generally in the case of capacitively sampled pressure sensors), although there is a suitable counterelectrode, typically very high deflection voltages are nonetheless necessary (at least a few 10 V for a pressure range around approximately 1 bar). Such high deflection voltages are however not available on sensor modules having a typical operating voltage of approximately 5 V. A passive self-test of a pressure sensor with just one diaphragm can usually be effected only if the sensor is exposed to a precisely defined or known reference pressure. However, this is not normally the case, with the result that neither changes in the accuracy nor possible damage to the sensor can be identified with a passive self-test.

Published Non-Prosecuted European Patent Application EP 0 753 728 A2 discloses a differential semiconductor pressure sensor having two measuring diaphragms operating in opposite phases, which enables the static pressure error and temperature error to be eliminated by the detection of the different deflections of the two measuring diaphragms.

U.S. Pat. No. 5,022,270 discloses a transmitter with a pressure sensor and an additional pressure sensor, the additional pressure sensor being used to increase the measurement range or for redundancy purposes.

U.S. Pat. No. 5,431,057 discloses a pressure sensor with a multiplicity of individual sensors disposed on a matrix, the individual sensors being connected via connecting arms in order to increase the capacitance and thus obtain a higher output signal.

SUMMARY OF THE INVENTION

It is accordingly an object of the invention to provide a micromechanical sensor, in particular a pressure sensor which overcomes the above-mentioned disadvantages of the heretofore-known sensors of this general type, which has a self-testing function, and which can be fabricated in a technically simple manner. Furthermore, the sensor should be suited for applications relevant to safety in the motor vehicle sector and should allow a self-testing which is sufficiently reliable but can be implemented in a simple manner. A further object of the invention is to provide a method for operating the sensor.

With the foregoing and other objects in view there is provided, in accordance with the invention, a micromechanical sensor, including:

a substrate;

an active element including at least two partial structures, the partial structures being exposed, during an operation, to a physical quantity to be measured and being one of functionally identical and structurally identical;

an electronic evaluation circuit coupled to the active element;

the partial structures supplying, during the operation, respective measurement signals to the electronic evaluation circuit;

the partial structures and the electronic evaluation circuit being integrated in the substrate; and the electronic evaluation circuit having a comparison circuit for comparing the respective measurement signals and for generating a comparison signal such that the comparison signal is ZERO if, according to an ideal case, the partial structures are completely identical and are jointly exposed to the physical quantity.

In other words, the invention provides for the active element or acting element to include at least two partial structures which are exposed to the same physical quantity to be measured. Each partial structure supplies a measurement signal to the evaluation circuit. The evaluation circuit has a comparison circuit in which the at least two measurement signals are compared and which supplies a comparison signal as a result. An essential idea of the invention is that the active element of the sensor, that is to say the pickup or transducer, in particular a capacitive pickup, which normally supplies the useful signal, includes at least two partial structures whose supplied information items are averaged.

Partial damage can then be identified due to the fact that the signals of the two partial structures are compared with one another. If both partial structures are in order, the resultant comparison signal should produce a predetermined value, e.g. ideally zero in the case of a difference signal. Taking into account tolerance-dictated differences, or possible offset corrections, a test signal is produced which at most deviates slightly from the predetermined "zero value" but depends hardly at all on the physical input quantity (for example the pressure) to be measured. In the case of partial damage to the sensor, a signal is produced which deviates distinctly from the "zero value" and, when compared with the desired signal of the undamaged sensor, allows to identify a damage.

According to the invention, the at least two partial structures of the active element are configured to be functionally or structurally identical. Due to the identical construction and/or identical circuitry of the partial structures, it is ensured that the signals supplied by the partial structures of the active element are practically identical.

According to a preferred embodiment of the sensor, outputs of the two partial structures are coupled to inputs of a sigma-delta converter.

In accordance with another feature of the invention, the comparison circuit is configured as a subtractive comparison circuit and is further configured such that the comparison signal supplies an averaged value, in particular an addition value or a subtraction value, of the respective measurement signals.

In accordance with yet another feature of the invention, the electronic evaluation circuit is a digital evaluation circuit and the respective measurement signals are analog measurement signals. An A/D converter is connected downstream of the active element and converts the analog measurement signals to a digital signal which is processed by the digital evaluation circuit.

In accordance with a further feature of the invention, the partial structures are driven in phase or in opposite phase.

In accordance with another feature of the invention, the active element includes a diaphragm having two diaphragm surfaces and having sides. The diaphragm is clamped at the sides and bulges in response to a pressure difference between the two diaphragm surfaces.

The sensor according to the invention is preferably a micromechanical pressure sensor with a capacitive signal conversion.

With the objects of the invention in view there is also provided, a method for operating a sensor, which includes the steps:

providing an active element including at least two partial structures being one of functionally identical and structurally identical and providing an electronic evaluation circuit having a comparison circuit, the active element and the electronic evaluation circuit being integrated in a single substrate;

exposing the partial structures to a physical quantity;

driving the partial structures such that respective output signals of the partial structures are subtracted from one another;

comparing, with the comparison circuit, the respective output signals for providing a comparison signal such that the comparison signal is ZERO if, according to an ideal case, the partial structures are completely identical and are jointly exposed to the physical quantity; and generating, with the electronic evaluation circuit, a diagnostic signal for ascertaining whether the active element is functioning properly.

In accordance with another mode of the invention, the partial structures are driven such that the respective output signals of the partial structures are added for generating a useful signal. A measured value is then determined from the useful signal.

In other words, in the case of the method for operating the sensor, in order to generate a useful signal (from which the measured value is determined), the partial structures are driven in such a way that their output signals are added, and, in order to generate a diagnostic signal (which is used to ascertain whether the sensor is in order), the partial structures are driven in such a way that their output signals are subtracted.

Other features which are considered as characteristic for the invention are set forth in the appended claims.

Although the invention is illustrated and described herein as embodied in a micromechanical sensor and method for operating the sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a partial, diagrammatic cross-sectional view of a capacitive pressure sensor according to the invention;

FIG. 2 is a diagrammatic plan view of the pressure sensor;

DESCRIPTION OF THE PREFERRED EMBODIMENTS

Figure 3:
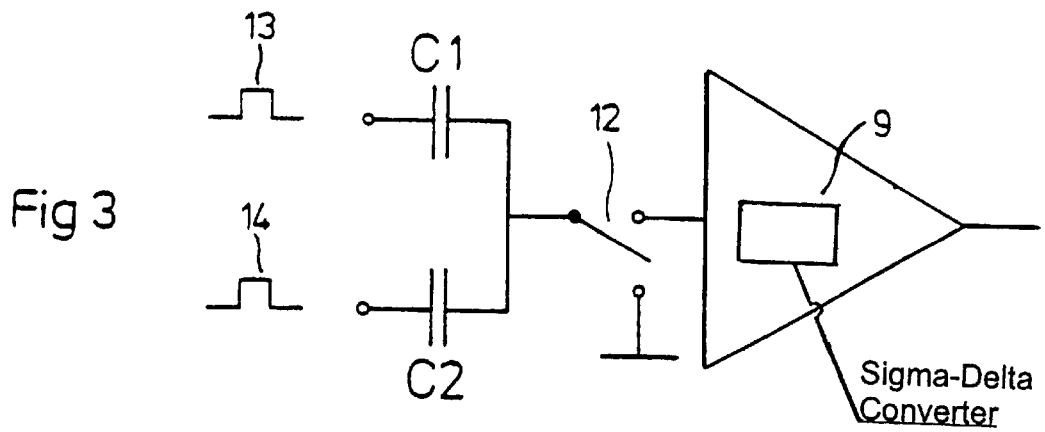
FIGS. 3 and 4 are schematic block circuit diagrams illustrating the operation of the pressure sensor.

Referring now to the figures of the drawings in detail and first, particularly, to FIGS. 1 and 2 thereof, there is shown a capacitive pressure sensor 1 which is a micromechanical sensor. FIG. 1 illustrates a cross section along the line I—I in FIG. 2. The sensor has at least two diaphragms or membranes 3 made of a thin, doped polysilicon film. The diaphragms are produced on a silicon substrate 2 through the use of micromechanical methods and span the cavities 4 in an oxide layer 5 that are formed on the surface of the silicon substrate 2, and bulge when the pressure to be measured takes effect. The diaphragms 3 act as first electrodes of the capacitors C1 and C2. A respective well region 6 doped into the silicon substrate 2 serves as the second electrode or counterelectrode, the cavities 4 being situated above the well region.

The monolithic pressure sensor 1 is thus fabricated through the use of surface-micromechanical methods ("surface micromachining"), where, in addition to polysilicon, other suitable electrically conductive materials can also be used for the diaphragm material, in order to capacitively sense the diaphragm deflections.

A significant advantage of this pressure sensor over a pressure sensor fabricated through the use of so-called bulk micromachining, in which the diaphragms are produced from monocrystalline silicon and in which piezoresistive signal acquisition is used, is that process steps similar to those used in the fabrication of conventional integrated circuits are used and, accordingly, the required circuits for the signal processing can be produced using the CMOS process steps which simplifies the integration of the components.

The plan view according to FIG. 2 shows two identically constructed partial structures 7 and 8 (with overall capacitors C1 and C2) each including, by way of example, six square individual diaphragms. The number and shape of the individual diaphragms are basically arbitrary. It is advantageous if the two partial structures 7 and 8 are each constructed identically and interconnected to form the overall capacitors C1 and C2, as is illustrated schematically in the cross-sectional view according to FIG. 1. The identical construction of the partial structures and the circuitry ensure that their capacitances C1 and C2 are practically identical. The absolute value of C1 and/or C2 is typically approximately 2 pF. A pressure signal of 100 Pa produces a change in the capacitance of typically 0.15 fF. Incidentally, this imposes stringent requirements on the evaluation electronics.

Figure 4:
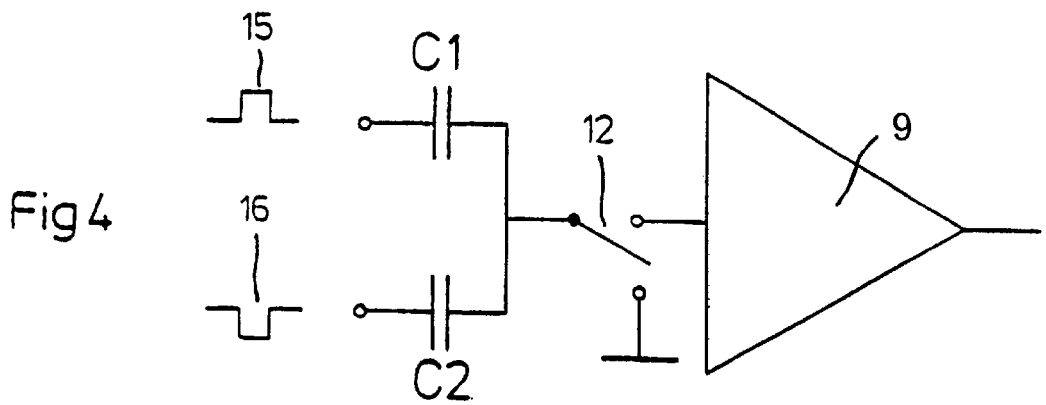

In the block diagrams of the circuitry of the pressure sensor 1 in accordance with FIGS. 3 and 4, for the sake of simplicity the partial structures of the sensor are represented by the capacitors C1 and C2 and the evaluation circuit, which is likewise formed in an integrated manner from the silicon substrate 2 of the sensor component, is indicated with the reference numeral 9.

In accordance with FIG. 3, the capacitors C1 and C2 are driven in-phase by the signals 13, 14, the outputs of the capacitors C1 and C2 being jointly connected to the clocked switch 12 connected upstream of the circuit configuration 9. The circuit configuration 9 and the switch 12 schematically represents an analog-to-digital (A/D) converter which, in turn, has a schematically shown second-order sigma-delta modulator and a two-stage digital decimation filter.

This driving results in a useful signal which is provided essentially by the sum of the two individual signals of C1 and C2. For faultless sensors the following holds true: C1 is identical to C2 and C1+C2 produce a pressure-dependent useful signal.

In accordance with FIG. 4, the capacitors C1 and C2 are driven in-antiphase by the signals 15, 16. This driving results in a subtraction of the capacitive input signals and a diagnostic signal which is provided by the difference between the two individual signals of C1 and C2 and is used to ascertain whether the sensor is in order.

The diagnostic signal is ZERO, apart from a possible offset correction, in the case of faultless sensors and has a value other than ZERO if the sensor is damaged.

The principle of the invention is not limited, however, to the exemplary circuitry, demonstrated in FIGS. 3 and 4, with either a strictly in-phase or a strictly in-antiphase driving of the individual capacitors C1 and C2. Rather, more complex circuitry configurations are also possible.

Figure 5:
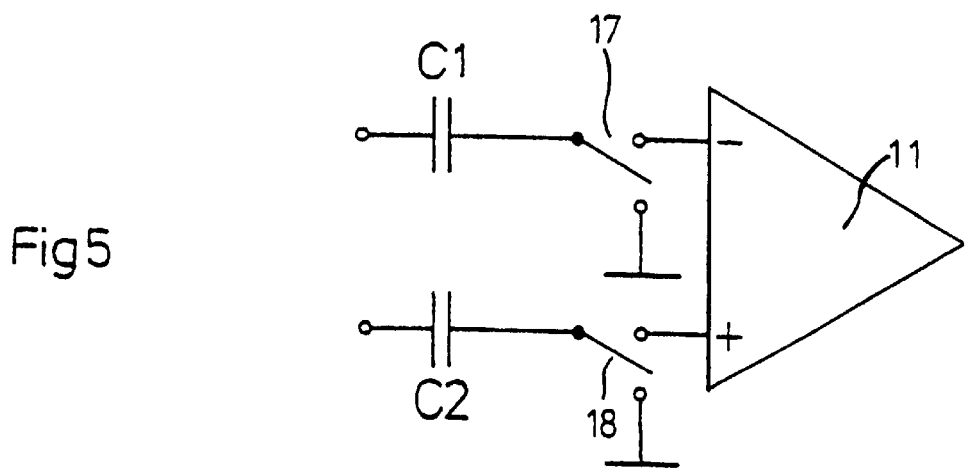
FIG. 5 is a schematic block circuit diagram of a further circuit configuration of the pressure sensor with alternately antiphase driving or in-phase driving.

FIG. 5 illustrates a further exemplary embodiment, in which the (alternately driven) capacitors C1 and C2 are respectively assigned to separate switches 17, 18, which are in turn assigned to two separate inputs of an evaluation circuit 11 configured as an operational amplifier circuit or comparator circuit.

We claim:

1. A micromechanical sensor, comprising:
    a substrate;
    an active element including at least two partial structures, said partial structures being exposed, during an operation, to a physical quantity to be measured and being one of functionally identical and structurally identical;
    an electronic evaluation circuit coupled to said active element;
    said partial structures supplying, during the operation, respective measurement signals to said electronic evaluation circuit;
    said partial structures and said electronic evaluation circuit being integrated in said substrate; and
    said electronic evaluation circuit having a comparison circuit for comparing the respective measurement signals and for generating a comparison signal such that the comparison signal is ZERO if, according to an ideal case, said partial structures are completely identical and are jointly exposed to the physical quantity.

2. The sensor according to claim 1, wherein said electronic evaluation circuit includes a sigma-delta converter.

3. The sensor according to claim 1, wherein said comparison circuit is a subtractive comparison circuit and is configured such that the comparison signal supplies an averaged value of the respective measurement signals.

4. The sensor according to claim 1, wherein said comparison circuit is a subtractive comparison circuit and is configured such that the comparison signal supplies an addition value of the measurement signals.

5. The sensor according to claim 1, wherein said comparison circuit is a subtractive comparison circuit and is configured such that the comparison signal supplies a subtraction value of the measurement signals.

6. The sensor according to claim 1, wherein said electronic evaluation circuit is a digital evaluation circuit and the respective measurement signals are analog measurement signals, and including an A/D converter connected downstream of said active element and converting the analog measurement signals to a digital signal, said digital evaluation circuit processing the digital signal.

7. The sensor according to claim 1, wherein said partial structures are configured to be driven in phase.

8. The sensor according to claim 1, wherein said partial structures are configured to be driven in opposite phase.

9. The sensor according to claim 1, wherein said active element includes a diaphragm having two diaphragm surfaces and having sides, said diaphragm is clamped at said sides and bulges in response to a pressure difference between said two diaphragm surfaces.

10. The sensor according to claim 1, wherein said active element and said electronic evaluation circuit form a micromechanical pressure sensor with a capacitive signal conversion.

11. A method for operating a sensor, the method which comprises:
    providing an active element including at least two partial structures being one of functionally identical and structurally identical and providing an electronic evaluation circuit having a comparison circuit, the active element and the electronic evaluation circuit being integrated in a single substrate;
    exposing the partial structures to a physical quantity;
    driving the partial structures such that respective output signals of the partial structures are subtracted from one another;
    comparing, with the comparison circuit, the respective output signals for providing a comparison signal such that the comparison signal is ZERO if, according to an ideal case, the partial structures are completely identical and are jointly exposed to the physical quantity; and
    generating, with the electronic evaluation circuit, a diagnostic signal for ascertaining whether the active element is functioning properly.

12. The method according to claim 11, which comprises:
    driving the partial structures such that the respective output signals of the partial structures are added for generating a useful signal; and
    determining a measured value from the useful signal.

* * * * *

UNITED STATES PATENT AND TRADEMARK OFFICE
CERTIFICATE OF CORRECTION

PATENT NO. : 6,357,298 B1
DATED : March 19, 2002
INVENTOR(S) : Dieter Draxelmayr et al.

It is certified that error appears in the above-identified patent and that said Letters Patent is hereby corrected as shown below:

<u>Title page,</u>
Item [30], should read as follows:

-- Foreign Patent Application Data
Sept. 30, 1997 ……... (DE) 197 43 288.3 --

Signed and Sealed this

Tenth Day of September, 2002

Attest:

JAMES E. ROGAN
*Attesting Officer*     *Director of the United States Patent and Trademark Office*